United States Patent [19]

Buchanan

[11] Patent Number: 4,938,076

[45] Date of Patent: Jul. 3, 1990

[54] TARGET FLUID FLOW INDICATOR GAUGE

[75] Inventor: Steven O. Buchanan, Rolling Prairie, Ind.

[73] Assignee: Dwyer Instruments, Inc., Michigan City, Ind.

[21] Appl. No.: 380,450

[22] Filed: Jul. 17, 1989

[51] Int. Cl.⁵ .......................... G01F 1/24; G01F 1/28
[52] U.S. Cl. ................................ 73/861.53; 73/861.74
[58] Field of Search .......... 73/861.53, 861.58, 861.71, 73/861.74, 861.75, 861.76

[56] References Cited

U.S. PATENT DOCUMENTS

| | | | |
|---|---|---|---|
| 881,586 | 3/1908 | Howe-Gould | 73/861.75 |
| 1,114,684 | 9/1914 | Vaughan | 73/861.53 |
| 2,735,299 | 2/1956 | Blackburn et al. | 73/861.71 |
| 3,331,388 | 7/1967 | Evans et al. | 73/861.74 X |
| 3,862,416 | 1/1975 | Phillips et al. | 250/209 X |
| 4,030,365 | 6/1977 | Phillips et al. | 73/708 |
| 4,729,782 | 3/1988 | Furuse | 73/861.53 X |
| 4,841,782 | 6/1989 | Buchanan | 73/861.74 |

Primary Examiner—Herbert Goldstein
Attorney, Agent, or Firm—Lee, Mann, Smith, McWilliams & Sweeney

[57] ABSTRACT

A target fluid flow indicator gauge comprising a non-magnetic housing defining inflow and outflow ports and a cross channel including a rounded portion that is curvilinear about an axial center that is coaxial with a fluid flow central axis through the gauge, with the channel rounded portion lying in a plane that extends normally of such axial centers and functions as a conduit for the fluid flow that is to be measured, a leaf spring adjustably and cantilever mounted in an upper portion of the housing chamber and adjacent one end of the spring, which leaf spring at the other end of same is fixed to a rigid lever arm that extends diametrically across the channel rounded portion, an orifice coaxial with said axis through which the fluid flow is directed into the chamber portion and defining a throat portion of novel configuration at the downstream end thereof that opens into the channel portion, with the lever arm mounting a target in centered relation within the orifice throat portion in coplanar, close fitting relation to the upstream end thereof, with the housing directing fluid flow into the channel against the target and out of the chamber in a predetermined fluid flow direction through the housing and the lever arm carrying a driving magnet assembly adjacent the target that is magnetically coupled to an externally located follower magnet assembly that acts to pivot an indicator pointer to provide an output that is linear over the range of the gauge.

18 Claims, 6 Drawing Sheets

TARGET FLUID FLOW INDICATOR GAUGE

This application is concerned with an improvement in the gauge of my U.S. Pat. No. 4,841,782, granted June 27, 1989.

The present invention relates to a target fluid flow indicator gauge, and more particularly, to a gauge arrangement for measuring the rate of liquid or gas flow through a conduit, and as an option, provides for remotely located control of the rate of fluid flow between high and low flow rate set points.

Air and liquid flow rate indicators commonly are arranged to have the fluid flow involved impinge against a target, the deflection of which gives an indication of the fluid flow rate. However, prior devices of this type have been subject to inaccuracies for various reasons, an important one of which the Applicant has found to be that the readout of the device becomes non-linear for a number of reasons, and the readout in any event may be adversely affected by target oscillations as the fluid moves about it.

A principal object of the invention is to provide a fluid flow rate indicator having a linear readout that permits the use of a linear scale and pointer therefore for directly reading fluid flow rate in terms of, for instance, gallons per minute, for liquids, and cubic feet per minute for gas or air (or the use of the metric system in providing the instrument readout).

Another principal object of the invention is to arrange the instrument so that its readout is effected by way of a magnetically coupled motion transmitting arrangement involving the use of permanent magnets to provide a magnetic coupling acting through an imperforate wall structure of the instrument housing that transmits the deflection of the target to a pivotally mounted pointer, while insuring that the target deflection under the fluid flow involved is linear, and that the leverage that effects pivoting of the pointer by way of the magnetic coupling involved is sufficiently short to avoid introducing non-linearity into the instrument readout.

Another principal object of the invention is to provide a fluid flow indicator gauge that will handle fluids at high temperatures and/or pressures, and that also may be corrosive, without affecting the accuracy of the instrument readout.

Still another principal object of the invention is to provide a gauge that effects measurement of a wide variety of fluid flows with minimal or no part change over being required, and that permits readily effected calibration for different flow ranges.

Still another important object of the invention is to provide a fluid flow indicator gauge that allows linear scale construction, that involves few and simple parts, that is easily installed and used, that is economical of manufacture, that is long lived in use, and that can optionally be equipped to provide for control of fluid flows between low and high set points.

In accordance with the present invention, a target fluid flow indicator gauge is provided for handling the flow of either liquids or gases (including air) comprising a nonmagnetic housing assembly that includes a housing member, a specially contoured tubular member, and a back plate for the housing member that, as assembled, defines a fluid flow way or channel through the gauge comprising a target chamber that is curvilinear about an axial center that is centered with the way fluid flow central axis through the gauge along which are provided inflow and outflow ports at opposite ends of the housing assembly that are centered on said fluid flow central axis, with such way including an orifice having a specially contoured throating that in part forms the target chamber rounded portion, to direct fluid flow through the target chamber rounded portion and out of the gauge in a predetermined fluid flow direction through the housing assembly that parallels and includes said main axial center. Mounted within the housing and exposed to the way and its target chamber is an adjustable range spring in the form of a leaf spring cantilever mounted adjacent one end of same to dispose the leaf spring live end to extend toward the way proximate the downstream end of the tubular member. The tubular member is internally formed to be shaped in the form of an elongated orifice that is centered on said axial center and defines an upstream throat that is cylindrical in configuration and a downstream throat that forms the way curvilinear portion that is of special concave contour, and that also defines the aforementioned target chamber. A lever arm affixed to the live end of the leaf spring extends diametrically across the way proximate the way rounded channel portion, the latter lying in a plane that extends normally of the way central axis. A target of round disc-like construction is anchored to the lever arm and disposed on the lever arm in centered relation with, and is disposed within and transversely of the target chamber, coaxially of its axis, and in close fitting relation to the concave surfacing of same. The target mounting lever arm also has fixed to same, and adjacent the target, a driving magnet assembly that is magnetically coupled to a follower magnet assembly located externally of the housing, with the magnetic coupling acting through an imperforate wall structure of the housing that is of film thickness dimensions for forming a "window" for the magnetic flux involved free of fluid leakage to the ambient atmosphere.

The gauge externally of the housing includes an indicator pointer journaled to pivot about an axis that extends generally crosswise of the fluid flow direction, with the follower magnet assembly acting through a sufficiently short lever arm on the journaled pointer shaft to linearly deflect the pointer in proportion to the deflection of the target under the impetus of fluid flow experienced by the target.

The Applicant has found that, by keeping the leverage that the indicated follower magnet acts through to pivot the indicator pointer of small or short dimensions, so that the leverage it acts through to pivot the pointer lies in the range of from about 0.100 inch to about 0.200 inch, the readout of the gauge is linear. The gauge thus can be, and is, equipped with a linear scale, also located externally of the housing assembly, and underneath the indicator pointer, with both the indicator pointer and scale being enclosed by a suitable cover, a portion of which is transparent for easy reading of the gauge. The gauge scale may be in terms of gallons per minute if the flow rate of liquids is to be measured, or in terms of cubic feet per minute if the flow rate of gas or air is to be measured (and, of course, the metric system or any other commonly used flow measurement units may alternately be employed, as desired).

The range spring of the gauge is equipped for calibration, or for adjustment of the calibration, for different flow ranges.

The gauge of the invention can optionally be equipped for control of the flow rates between high and low flow rate set points by applying the principles of Phillips and Zoludow U.S. Pat. No. 3,862,416 (assigned to the same assignee as the instant application) to same, as will be brought out hereinafter.

Other objects, uses, and advantages will be obvious or become apparent from a consideration of the following detailed description and the application drawings in which like reference numerals indicate like parts throughout the several views.

However, it is to be distinctly understood that the drawing illustrations referred to are provided primarily to comply with the disclosure requirements of the Patent Laws, and that the invention is susceptible of modification and variations that will be obvious to those skilled in the art, and that are intended to be covered by the appended claims.

GENERAL DESCRIPTION

Figure 1:
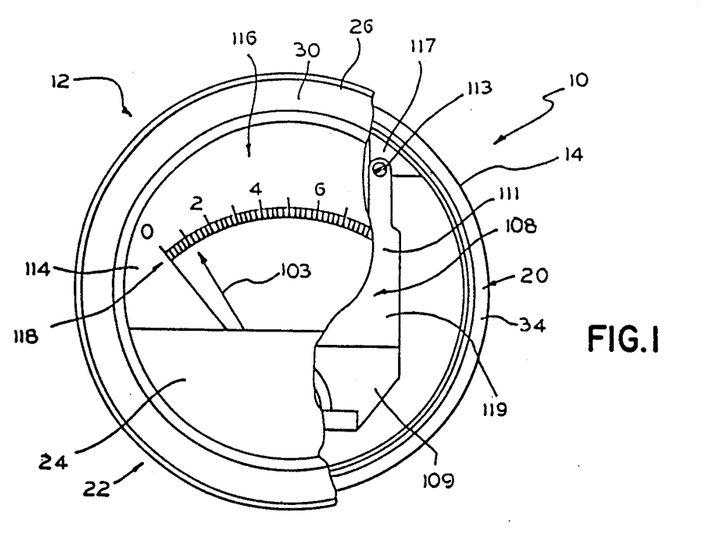
FIG. 1 is a top plan view of one embodiment of the invention, with parts broken away to expose other parts, including the gauge wishbone that pivotally mounts the gauge pointer that is shown cooperating with the gauge scale plate that overlies the gauge wishbone.
Figure 2:
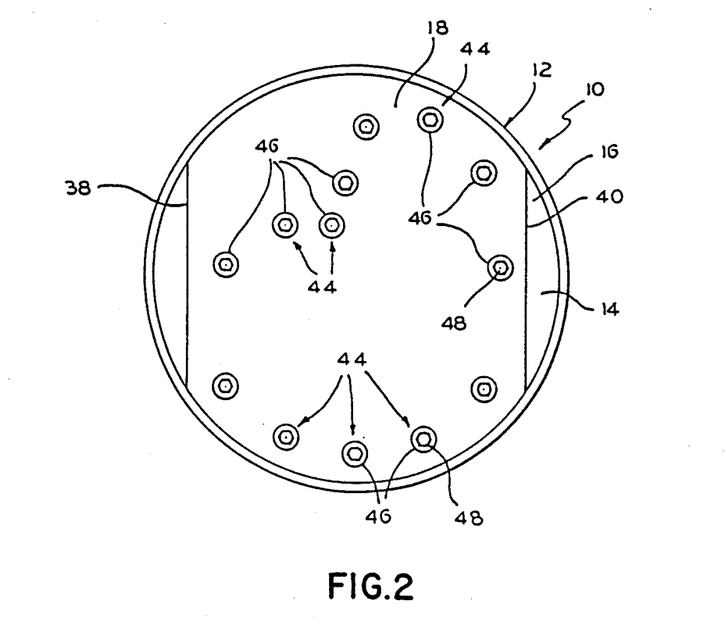
FIG. 2 is a back plan view of the gauge as shown in FIG. 1.
Figure 3:
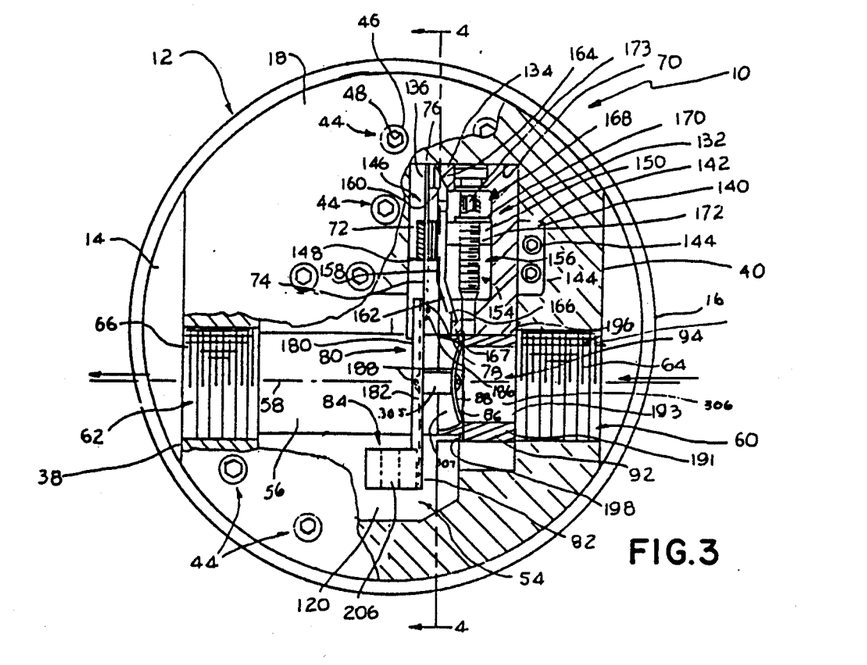
FIG. 3 is a back plan view of the gauge with the housing assembly involved being shown in section and broken away to expose important components of the invention.
Figure 4:
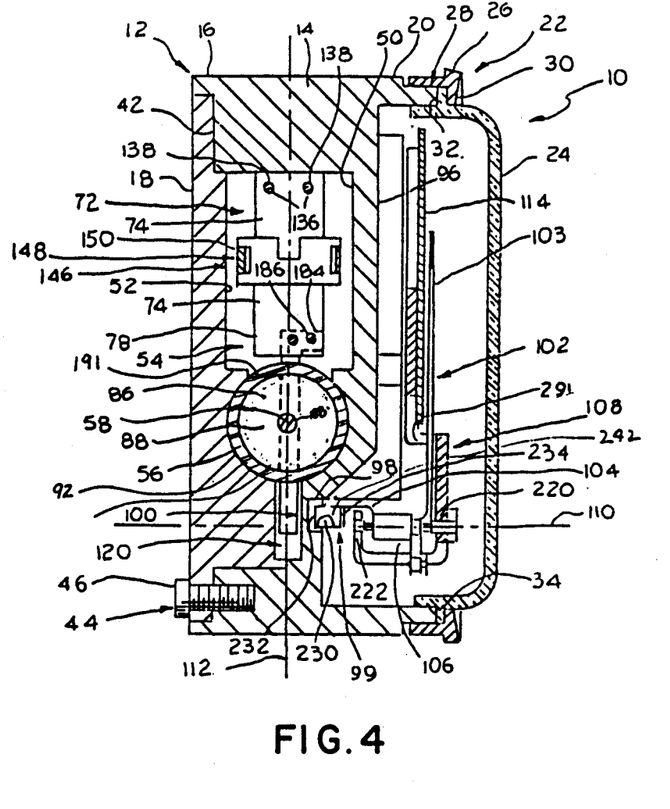
FIG. 4 is a sectional view through the gauge taken substantially along line 4—4 of FIG. 3.

Reference numeral 10 of FIGS. 1-4 generally indicates a target fluid flow indicator gauge comprising one embodiment of the present invention, which comprises housing assembly 12 that includes housing member 14 that is generally cylindrical in external configuration, and has applied to its base or back portion 16 a back cover plate 18, and that has applied to its front side 20 a cover 22 that in and of itself may be entirely conventional and as shown comprises a cover member 24 that is formed from a suitable transparent material (such as glass or a suitable plastic) and that is held in place by an annular clamp member or bezel 26 threadedly secured to the housing member 14 where indicated by reference numeral 28 (see FIG. 4). As illustrated, the bezel 26 includes an annular flange 30 that engages the annular flange 32 of the cover member for this purpose, to hold the cover member 24 against the rim 34 of housing member 14. As will be apparent, a suitable 0 ring seal may be interposed between the cover member flange 32 and the rim 34 of housing member 14 for sealing purposes, if so desired.

The housing member front side 20 is cylindrical in configuration thereabout; the housing member 14 to the rear of the housing member front side 20 defines planar end walls 38 and 40 (see FIG. 3), with the housing member 14 being suitably recessed at its back side 16, as at 42 (see FIG. 4), to receive the back plate 18, which is held in place by suitable screws 44 that pass through holes appropriately formed in the back plate 18 into correspondingly located threaded apertures formed in the housing member 14 for securing the back plate 18 to the housing member 14. The securement arrangement may be of any suitable type, that shown including an enlarged head 46 (see FIG. 4) defining a hex shaped recess 48 (see FIG. 2) to receive a suitable, correspondingly shaped, hex tool for threading screws 44 in place.

The housing member 14, the back plate 18, the bezel 26, and screws 44 are formed from materials that are of the non-magnetic type, such as aluminum, brass, stainless steel, or alloys of same that are non-magnetic.

In the illustrated embodiments, inner surfacings 50 and 52 of the housing member 14 and its back plate 18 are shaped to define (see FIGS. 3 and 4) an internal chamber 54 having a curvilinear or circular portion 56 (see FIG. 4) that is curvilinear about axial center 58. The housing member 14 and back plate 18 also define suitable inflow port 60 and outflow port 62 (see FIG. 3) that are both of the usual circular in configuration and are centered on the axis 58 that thus also coincides with the axial center of the fluid flow that is to pass through gauges 10 (see FIG. 1-4) and 10A (see FIGS. 6-8 which modification also has flow axis 58). Ports 60 and 62 are internally threaded, as indicated at 64 and 66, respectively, for application thereto of the threaded ends of conduiting that will bring the fluid flow involved to the gauge 10 and take it away from the gauge 10 (the source and disposal of the fluid flow rate measured by the gauge 10 will depend on the nature of the application of gauge 10, as will be apparent to those skilled in the art). Ports 60 and 62 are coaxial with axis 58, as indicated in FIG. 3.

In the form shown, the housing assembly 12 receives at its curvilinear portion 56, and is thus equipped with, tubular member 92 defining orifice 94 that is also centered on the axis 56. Orifice 94, in accordance with the present invention, is formed to define the hereinbefore referred to cylindrical throat 306 and concave, curvilinearly contoured throat 307 that will be discussed in detail hereinafter. The instruments 10 and 10A, as assembled, define a flow way that is formed by the ports 64 and 66, the orifice 94 of tubular member 92 and chamber 54.

Figure 5:
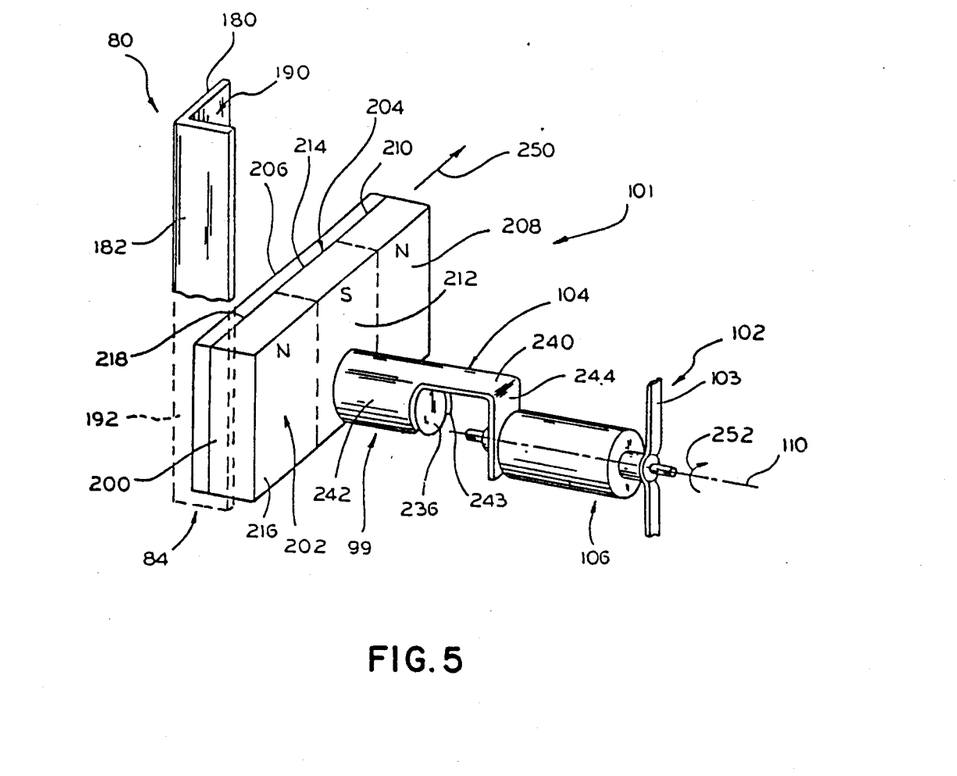
FIG. 5 is a diagrammatic perspective view illustrating the magnetically coupled motion transmitting arrangement employed in accordance with the invention, with the housing assembly wall that separates the two permanent magnet assemblies involved being omitted to simplify the drawings.

The housing member 14 is suitably recessed, as at 70 (see FIG. 3) in the illustrated embodiment, to receive an adjustable range spring assembly 72 that includes a leaf spring 74 that is cantilever mounted at its end 76, with the leaf spring 74 at its end 78 mounting a rigified lever member 80 that, in the assembled relation of instruments 10 and 10A, extends diametrically across the way 95 and fixedly carries at its free end 82 a drive magnet assembly 84 (see FIGS. 3 and 5). Secured to the lever member 80 in centered relation with the orifice 94, and specifically with its axis 58, is a disc type target 86 (see FIGS. 3 and 3A) that may be formed from brass or the like, and is of convexo-concave configuration, with the convex side 88 of same facing the direction of fluid flow out of the gauges 10 and 10A. In accordance with the present invention, target 86 is preferably positioned zero to about 0.012 inch from (to the left of FIG. 3) the plane marked P-P at the exit throat 306 (see FIG. 3A), and is disposed within, and travels totally within the throat 307, and in centered relation to the axis 58. The throating of orifice 94, in accordance with the invention, is shaped to promote a linear relationship between the deflection of target 86, under the pressure of the fluid flow through instruments 10 and 10A, and the resulting flow rate, for linear readout of such flow rate by the instruments 10 and 10A, as described in detail hereinafter.

The housing member 14 on its external front side 96 that faces cover 24 is formed with a slot or recess 98 (see FIG. 4) that is aligned with the drive magnet assembly 84 transversely of the gauges 10 and 10A and extends coterminously with, and is aligned with, the possible path of movement of the drive magnet assembly 84 (which, as disclosed hereinafter, is of limited length due to the limited length of the maximum deflection of target 86 that is contemplated by the present invention, as discussed in detail hereinafter. Disposed in the slot 98 is a follower magnet assembly 99 that is magnetically coupled through imperforate housing wall structure 100 (which is integral with the housing member 14) for linear readout using indicator pointer assembly 102. The drive magnet assembly 84 and the follower magnet assembly 99 form a magnetically coupled motion transmitting device or assembly 101 (see FIG. 5).

The follower magnet assembly 99 is suitably affixed to arm 104 of suitable pointer shaft 106 (see FIGS. 4 and 5) that is suitably journaled in wishbone 108 to pivot about pivot axis 110 that extends normally to the plane of the movement path made by lever member 80 when instruments 10 and 10A are operating, which plane is represented by broken line 112 of FIG. 4.

The pointer assembly 102 includes a suitable pointer arm 103 that cooperates with suitable scale of dial plate 114 that is secured to the wishbone 108 in any suitable manner (ordinarily using screws that are not shown to avoid unnecessary detail), and that is visible through transparent cover 24. The dial or scale 114 has suitable indicia 11 (see FIG. 1) applied to same for reading the gauge in terms of fluid flow per unit of time, with the datum zero mark being diagrammatically illustrated at 118 (of FIG. 1).

In accordance with the present invention, the target 86 and the orifice 94 are both centered in on axis 58 and are in size minimized (for instance, the target is 0.707 inch in diameter in a working embodiment), and the lever arm or leverage that the follower magnet assembly 99 acts through to pivot pointer 103 about axis 110 preferably lies in the range of from about 0.100 inch to about 0.175 inch, and preferably is about 0.15 inch in length, and thus is very short.

The imperforate wall structure 100 of the housing member 14 is preferably of film thickness dimensions, and preferably lies in the range of from about 0.050 inch to about 0.070 inch (0.062 in a working embodiment), to form a magnetic flux passing "window" through which the magnetic flux of the drive magnet assembly 84 couples with the magnetic flux of the follower magnet assembly 99 for controlling the position of the pointer arm 103 relative to scale 116 when the gauges 10 and 10A experience fluid flow therethrough in the manner indicated by the flow direction indicated in FIG. 3.

The range spring assembly 72 is arranged so that it can be calibrated for different flow ranges, depending on the fluid to be measured by a gauge 10 or 10A. As indicated, gauges 10 and 10A may be employed to measure fluid flow therethrough of liquids, gases including air, and fluids that are at high temperatures and/or pressures, or that may be corrosive in nature. It will be observed that in accordance with the present invention (see FIG. 5) the drive magnet assembly 84 and the gauge internal components that move with it are housed within the confines of the internal chamber 54 that is defined by the housing member 14 and back plate 18. The pointer assembly 102 and the follower magnet assembly 99 that actuates same through the magnetic coupling (that is effected between the two magnet assemblies 84 and 99) are located externally of the housing assembly 12, and thus have no contact with the fluid involved in the fluid flow being measured by, for instance, gauge 10. The wall structure 100 is of film thickness proportions to define the afore mentioned magnet flux "window", and is made imperforate to confine the fluid flow being measured to within the confines of housing assembly 12 (and the conduiting leading to and from same when a gauge 10 or 10A is installed).

Figure 6:
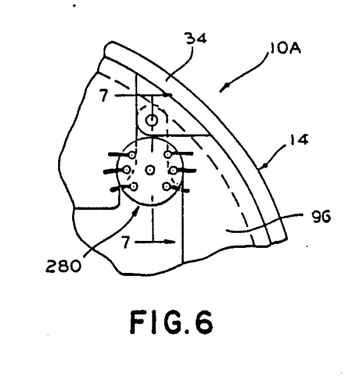
FIG. 6 is a fragmental front plan view of a modified embodiment of the gauge arranged for controlling the fluid flow measured by the gauge, in accordance with the afore identified Phillips and Zoludow U.S. patent.
Figure 7:
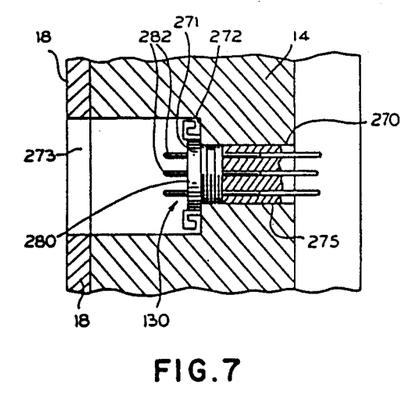
FIG. 7 is a fragmental sectional view substantially along line 7—7 of FIG. 6.
Figure 8:
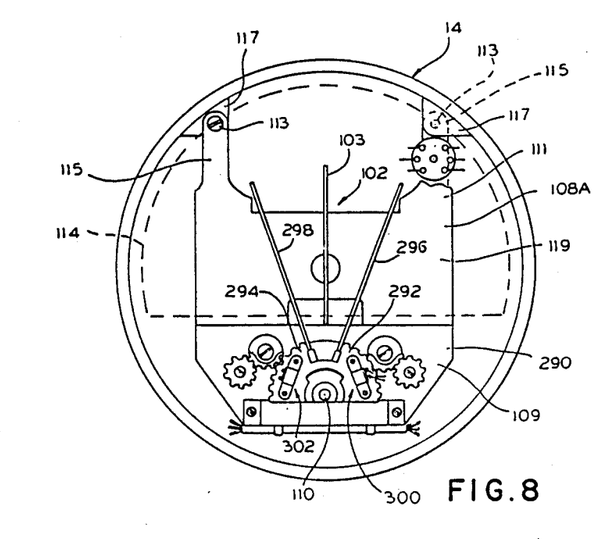
FIG. 8 is a top plan view of the modified gauge embodiment with the cover removed and showing the gauge as equipped for controlling the fluid flow rate between high and low flow rate set points in accordance with said Phillips and Zoludow patent.

As an optional feature of the invention, the gauge 10 may be converted into a fluid flow controller as well as providing the fluid flow measuring improvements provided by the embodiment of FIGS. 1–5, following the improvements disclosed in the afore referred to Phillips and Zoludow U.S. Pat. No. 3,862,416 the disclosure of which is incorporated herein by this reference). The modified gauge 10A of FIGS. 6–8 is diagrammatically and fragmentally illustrated in FIGS. 6–8 to achieve this end as disclosed in some detail hereinafter. With this arrangement, control over the rate of fluid flow is obtained between high and low fluid flow rate set points, and the control may be remotely located from the fluid flow controlled.

SPECIFIC DESCRIPTION

The housing member 14 and its back plate 18 are suitably formed from aluminum or the like, or other suitable non-magnetic material, to define the internal chamber 54 and its curvilinear portion 56 as well as define the extension 120 of chamber 54 in which the drive magnet assembly 84 operates (see FIG. 3). These components are also formed so that the internal chamber 54 exposes the range spring assembly 72 to the fluid that is to be passed through the gauge 10 or 10A for measuring and/or control purposes.

When a gauge 10 is to be converted or provided as hereinafter disclosed to provide a fluid flow controller in addition to flow rate readout, and thus provide the gauge 10A of FIGS. 6–8, an aperture is drilled and counterbored in place and a pronged plug 130 (see FIG. 7) is applied and suitably sealed thereabout (this is discussed hereinafter in detail).

The range spring assembly 72 may be essentially of the type disclosed in Phillips and Troyer U.S. Pat. No. 4,030,365 (also assigned to the Assignee of the present application) and thus includes a leaf spring 74 that is cantilever mounted at its end 76 for range spring adjustable mounting of the lever member 80 and the parts carried thereby in the chamber 54. The leaf spring 74, for application in the present invention, is applied to a cradle 132 (see FIG. 3) proportioned for close fitting reception in housing member recess 70 and defining a first pedestal 134 to which the leaf spring 74 is affixed at its end 76 by appropriate screws 136 applied to the leaf spring holes 138 (see FIG. 4). The cradle 132, which may also be formed from aluminum or the like, includes a second pedestal 167 and integral tab 140 (see FIG. 3) that is secured to the housing member 14 in recess 142 provided for this purpose, by suitable screws 144, which may also be of the cap type.

The cradle 132 is arranged as disclosed in the indicated Phillips and Troyer U.S. Pat. No. 4,030,365 (the disclosure of which is also incorporated herein by this reference) to provide spring rate adjusting device 146 for calibrating the range spring assembly 72 including clamp device 148 that comprises the U-shaped clamping member 150 that is received over the leaf spring 74 and is moved along a trackway 154 by drive device 156; a clamp lock member 158 having ramped ends 160 and 162 cooperating with ramps 164 and 166 of the respective cradle pedestals 134 and 167, when moved by drive device 168, sets the clamp device 148 against the leaf spring 74 at the desired location for the range spring fulcrum.

As disclosed in said Phillips and Troyer U.S. patent, the drive device 156 comprises a non-rotating nut member 170 that threadedly receives drive screw 172 that is journaled for rotation between the cradle pedestals 134 and 167. Nut 170 is suitably keyed to clamp member 150 for movement therewith. The clamp lock member 158 is moved upwardly or downwardly of FIG. 3 by drive device 168 that is disclosed in said Phillips and Troyer patent and includes a separate nut member (not shown) threadedly received on a screw member 173 that is journaled between the cradle pedestals 134 and 167, with the drive screw 172 being tubular and the indicated screw member 173 of drive device 168 being received through the bore of drive screw 172. These two screw members 172 and 173 turn independently of each other by way of suitable turning tools being inserted through a port formed in the side wall of housing member 14 that, when the necessary adjustment in the range spring device has been made, is sealed closed by a suitable plug, similar to the arrangement of said Phillips and Troyer U.S. patent, to which reference may be had for a complete disclosure of the range spring adjustment component parts referred to.

Thus, the live length of the leaf spring 74 may be adjusted as needed to calibrate the gauge 10 for different flow ranges. As will be apparent to those skilled in the art, the spring range assembly 72 may be made suitably adjustable in any other convenient manner known to the art.

The lever member 80 comprises a length of a suitable inflexible material in sheet metal form defining flanges 180 and 182 that are at right angles to each other, with the flange 182 defining a head section 184 (that flange 182 is integral with) that is secured to the projecting end 78 of the leaf spring 74 by suitable screws 186 (see FIGS. 3 and 4). As target 86 is to be disposed within tubular member 92 that defines orifice 94, target 86 is mounted on one end of spacer 305 by a first screw 188, spacer 305 being secured to the flange 182 of lever member 80 by second screw 188, all in coaxial alignment with the axis 58, as indicated in FIGS. 3 and 4; screws 188 may be of any suitable type. Lever member 80 (which is in the nature of a lever arm in function) defines internal corner 190 (see FIG. 5) into which the drive magnet assembly 84 is suitably bonded at the other end 192 of lever member 80, so as to be disposed within the extension 120 of the target chamber 54 in confronting relation with the housing wall structure 100 that is interposed between the drive magnet assembly 84 and the follower magnet assembly 99 (see FIG. 4).

As indicated, the target 86 may be in the form of a convexo-concave disc 88 that is centrally apertured to receive the first screw 188 for threadedly securing the target 86 to the spacer 305, which is in turn mounted on lever member 80, and specifically to its flange 182 in the illustrated embodiment, by the second screw 188.

The tubular member 92 comprises a tubular component 191 formed from a suitable non-magnetic material, such as aluminum, defining cylindrical bore 193 forming inlet 306 (see FIG. 3A) that is coaxially aligned with the axis 58, and that intersects throat 307 at plane P-P; member 92 also defines planar surfacing 196 that seats against the pedestal 167 (see FIG. 5) of the cradle 132, as well as indentation 198, so as to be fixedly secured between inflow inlet 60 and the target 86, in coaxial relation thereto, when the gauge components are assembled within the housing member 14, and the housing assembly back plate 18 is secured thereto (both the housing member 14 and the back plate 18 are internally configured to seat the orifice 92 in coaxial relation with target 86). The housing member 14 and its back plate 18 are shaped at their inner surfacings 50 and 52 to define the housing cylindrical portion that receives and forms a seat for member 92, that is coaxially aligned with axis 58, to complete the flow way 95 that extends between the inflow port 60 and the outflow port 66 (see FIG. 3).

The member 92, as indicated, defines orifice 94 that consists of inlet 306 to throat 307 and the outlet 308 (of throat 307). The margining wall of the inlet 306 is cylindrical, while the margining wall of the throat 307 is concentric about axis 58 and target 86 and is shaped according to the equation:

$$R = \left[ \frac{(R_o^2 - r_o^2)}{\sqrt{X_o}} \sqrt{X} + r_o^2 \right]^{\frac{1}{2}}$$

Figure 3A:
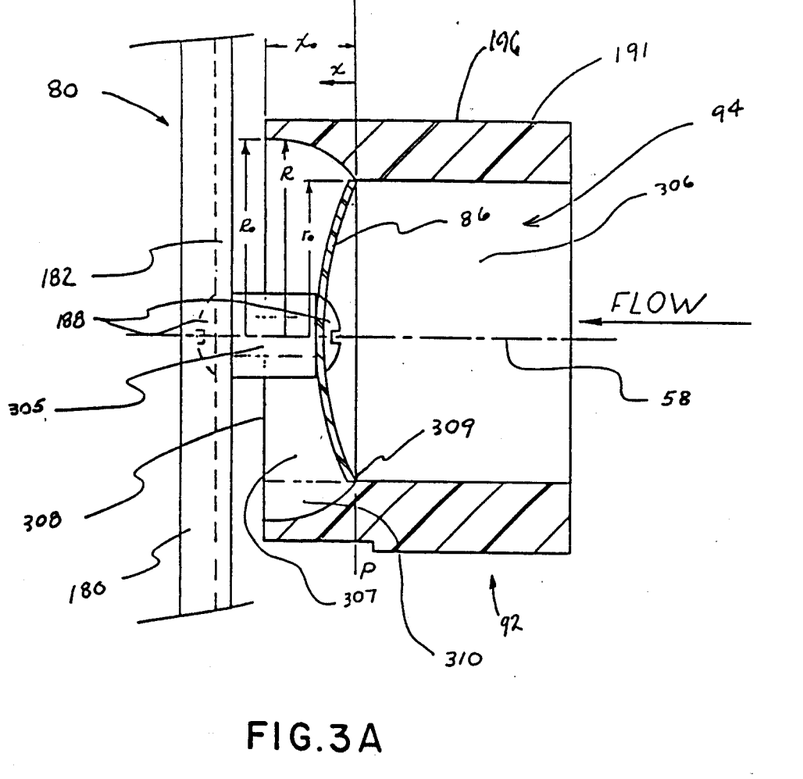
FIG. 3A is a fragmental view in section, illustrating the instrument way portion in some detail that defines the instrument orifice that forms the target chamber, its throating, and the instrument target.

The physical meaning of each of these symbols is illustrated in FIG. 3A as follows:

1. X equals the distance from a reference plane marked P-P on FIG. 3A, which is the boundary between inlet and outlet orifice throats 306 and 307 and X is positive in the outlet direction.

2. $r_o$ equals the radius of the outlet throat 307 at the throat boundary P-P where X=0 and also equals the radius of the target disc 86.

3. $R_o$ is the radius of the outlet throat 307 at the outlet boundary 308 where $X=X_o$ (see FIG. 3A) at the maximum dimension of X.

4. R is a variable radius of the outlet throat 307 for the interval $0 \leq X \leq X_o$, and its value depends on X, according to the aforementioned equation.

The target 86 is mounted and range spring assembly 72 adjusted, so that the leading edge 309 of target 86 is preferably in the throat 307 of the member 92 and is zero to about 0.012 inch away from the plane P-P, when no fluid is flowing through gauge 10 (when it is calibrated to set pointer 103 on the datum zero mark 118).

The orifice throat 307 defines a variable annular open area 310 (see FIG. 3A) that is concentric with target 86, and increases as the target 86 deflects (to the left of FIG. 3A) in response to fluid flow through gauge 100. The varied annular area 310 has been found by Applicant to provide a linear output movement of target 86 relative to member 92, as it serves the function of compensating for the non-linear relationship between the fluid force acting on target 86 and the fluid flow rate past same, when fluid flow moves as indicated through gauge 10.

The Applicant's derivation of this equation is presented hereinafter. Proper substitution of the annular area equation for throat 307 into the target and leaf spring force equation surprisingly yields a linear relationship between the volumetric fluid flow rate Q through orifice 94 and the target deflection X. Specifically, $Q = C_o X$ $C_o =$ constant $Q =$ volumetric flow rate in CFM or GPM for gas or liquid, respectfully.

The drive magnet assembly 84 comprises a magnet 200 that on surface 202 resides three pole faces 208, 212, and 216 (see FIG. 5) that are each of the same parallelepiped configuration and are adjacent to each other forming a single planar surface 202, and affixed, as by employing a suitable adhesive to a backing plate 206 that may be formed from steel or the like.

Thus, magnet 200, on surface 202, defines three pole faces 208, 212 and 216 of alternate polarity. On surface 204, the magnet 200 further defines three pole faces 210, 214, 218 such that pole face 208 is opposed by pole face 210, pole face 212 is opposed by pole face 214 and pole face 216 is opposed by pole face 218. All of the pole faces 208, 212, 216, 210, 214, 218 are of the same size located as indicated in FIG. 5 on surfaces 202 and 204, through the pole faces 208, 212, and 216 are respectively of opposite polarity of the respective pole faces 210, 214, and 218.

The magnet 200 is of a suitable permanent type and is formed from a suitable high energy product material such as the barium ferrite magnet products sold by the D. M. Steward Mfg. Company of Chattanooga, Tenn.

An energy product for magnet 200 in the range of from about 1 to about 3.75 million gauss-oersteds is preferred.

In accordance with the present invention, the magnet 200 is magnetized so that three pole faces 208, 212, 216 of alternate polarity are generated on surface 202.

In the form shown, the magnet 200 is applied to the backing plate 206 oriented to have the respective pole faces 208 and 216 of "North" polarity and the pole face 212 of a "South" polarity. As indicated, the magnet surface 202 and thus the pole faces 208, 212, 216 of the drive magnet assembly 84, is in confronting relation with the imperforate wall structure 100 that is of film thickness proportions, and accordingly is disposed oppositely of the follower magnet assembly 99. The pole faces 208, 212 and 216 of the drive magnet assembly 84 are in coplanar relation on surface 202 as indicated in FIG. 5 (which omits the wall structure 100 that is interposed between same and the follower magnet assembly 99).

It will be apparent that the functions of magnet 200 may be provided by separate permanent magnets of the same type serving the functions of magnet 200, and specifically, of its pole faces 208, 212, and 216.

The pointer assembly 102 comprises drive shaft 106 that is journaled by suitable jeweled assemblies 220 and 222 to wishbone 108, similar to the way the helix of the differential pressure gauge of the referred to Phillips and Troyer U.S. Pat. No. 4,030,365 is journaled (see FIG. 4 of that patent), with the drive shaft 106 being journaled to pivot about pivot axis 110 (and one of the jeweled pivot assemblies 220 or 222 being conventionally adjustable). Lever arm 104 is suitably affixed to drive shaft 106, employing adhesive, brazing, or the like, and mounts the follower magnet assembly 99 to pivot the drive shaft 16 about axis 110 in accordance with the deflection of the lever member 80 that results in corresponding deflection of the drive magnet assembly 84. The pointer arm 103 is suitably affixed to drive shaft 106 in any conventional manner to pivot therewith, in operative association with scale or dial plate 114. The pointer arm 103 may have operably associated therewith a suitable counter weight and support bracket therefore in accordance with known practices in this field for decreasing the forces needed to pivot the pointer arm 103 about its pivot axis 110.

The follower magnet assembly 99 comprises a cylindrical magnet 230 defining oppositely facing planar pole faces 232 and 234 (see FIG. 4) that are of opposite polarity. The magnet 230 may be formed from the same material, for instance, as magnet 200, with the magnet 230 being magnetized and oriented relative to the wall structure 100 such that the pole face 232 is of "North" polarity, and the pole face 234 is of "South" polarity. As better shown in FIG. 5, a steel plate 236 is magnetically adhered to the pole face 234 to concentrate therein its magnetic flux.

The nature of the lever arm 104 that secures the magnet 230 to the drive shaft 106 is better shown in FIG. 5, the arm 104 being in the nature of a bracket plate 240 defining a pair of embracing side arms 242 and 243 on either side of same between which magnet 230 is received (it being suitably bonded to the bracket 240 employing a suitable adhesive), with the bracket 240 defining a laterally extending arm 244 that is suitably fixed to drive shaft 106. Bracket 240 is formed from a suitable non-magnetic material, such as brass.

It will thus be seen that with the pole face 232 of magnet 230 and pole face 212 of magnet 200 being of opposite polarity, the follower magnet 230 is in effect trapped within the magnetic flux emanating from the magnet pole faces 208, 212 and 216 of the drive magnet assembly 84, with housing wall pole structure 100 acting as a magnetic flux passing "window" through which the magnetic flux of the respective magnet assemblies 84 and 99 acts in controlling the position of the magnet 230, and thus pointer arm 103, through lever arm 104, relative to pivot axis 110. It follows that the deflection of the target 86 when it experiences fluid flow thereagainst, effects deflection of the drive magnet assembly 84 in the direction of arrow 250 (see FIG. 5), that results in the pointer 102 being pivoted in the direction of the arrow 252 (again see FIG. 5), about pivot axis 110. When the fluid flow ceases, the bias acting on the leaf spring 74 returns the drive magnet assembly 84 to its original position, with the result that the pointer 103 returns to the datum zero read out position.

The wishbone 108 is of the type disclosed in the aforementioned U.S. Pat. Nos. 3,862,416 and 4,030,365, and has the scale or dial plate 114 suitably affixed thereto as disclosed in said patents.

The assembly of the gauges 10 and 10A for volume flow rate measurement purposes is completed by applying to same the cover 22 in the same manner as disclosed in said Phillips and Troyer U.S. Pat. No.

4,030,365, except that the cover member 24 may be free of any adjustment devices having engagement therethrough for application to any of the components of the gauges 10 and 10A.

Referring now to FIGS. 6-8, should it be desirable that the gauge be also arranged to control the fluid flow, as between high and low pressure set points, the arrangement, for this purpose, of the aforementioned Phillips and Zoludow U.S. Pat. No. 3,862,416 may be employed to provide the gauge 10A, which basically is the same as shown in FIGS. 1-5, but modified in accordance with FIGS. 6-8.

As shown in FIGS. 6 and 7, one approach to this arrangement comprises a suitable aperture 270 drilled in place through the housing member 14. A pronged plug 280 is potted in place with the plug flange 271 butted against surface 272 formed by the intersection of the counterbored composite aperture 273 formed in back plate 18 and housing 14, and the portion of housing 14 in which the drilled aperture 270 is formed, with a suitable epoxy filling 275 in aperture 270 The pronged plug 280 defines extending prongs 282 externally accessible through aperture 273 to make the electrical connections indicated in the circuit of FIG. 17 of said Patent 3,862,416 from outside of the plug 280, as indicated in FIGS. 4 and 14 of the same Patent. The plug 280 defines prongs that are accessible from the front of housing 14, and that are suitably electrically connected to prongs 282, and are sufficient in number to make the electrical connections for each wire involved in connection with the photocells and the penlight bulbs about to be described, which are shown in FIG. 8 applied to the wishbone 108A that is shown in FIG. 8. This may be done before the potting is applied, as indicated by FIG. 7.

In the showing of FIG. 8, the housing member 14 is the same as shown in FIGS. 1-4. The wishbone 108A is essentially the same as wishbone 108, and defines a free end 109 of same, with the other end 111 being secured cantilever fashion to the housing member 14 by suitable screws 113, which in the illustrated arrangement are applied to the respective wishbone legs 115 that are respectively mounted on suitable pedestals 117 defined by housing member 14, all as disclosed in said Phillips and Zoludow U.S. Pat. No. 3,862,416.

The pointer assembly 102 is journaled in the same manner as in connection with the gauge 10, and suitably affixed to the wishbone 108A is the dial plate 114, which is shown in dashed lines in the showing of FIG. 8 on top of the planar scale plate mounting portion 119 defined by wishbone 108A. Wishbone 108A is formed to define mounting panel portion 290 at the free end 109 of the wishbone and is offset outward of the level of portion 119 of the wishbone, to define a window opening 291 (not shown in FIG. 8, but see FIG. 4) through which the indicator arm 103 extends. As disclosed in said Phillips and Zoludow patent, mounted on the wishbone mounting portion 290 are a pair of gear segments 292 and 294 that respectively have secured thereto the respective set point arms 296 and 298, which also cooperate with the scale 116 on scale or dial plate 114, to provide, in accordance with the invention of said Phillips and Zoludow patent, switch control at selected high and low flows. This, of course, requires the application of cover arrangement of the type disclosed in said Phillips and Zoludow patent, to complete gauge 10A.

The respective gear segments 292 and 294 are mounted on the wishbone panel portion 290 for pivotal movement about the pivotal axis 110 of the pointer drive shaft 106. The respective gear segments 292 and 294 are equipped with turning knobs and connections thereto (not shown) in the manner fully disclosed in said Phillips and Zoludow patent, as indicated.

The respective gear segments 292 and 294 have adjustably mounted on same the respective photocells and associated light shields 300 and 302 of the type disclosed in said Phillips and Zoludow patent, which are arranged and associated with an appropriate long lived light bulb (not shown), whereby the set point arms 296 and 298 will set the high and low pressure functioning points of the respective photocells 300 and 302, as disclosed in said Phillips and Zoludow patent.

As further disclosed in said Phillips and Zoludow patent, the photocells 300 and 302 are incorporated with the indicated light bulb in the electrical circuiting that is diagrammatically illustrated in FIG. 17 (of said Phillips and Zoludow patent) to control the pair of switches (not shown) that are employed to provide the high pressure and low pressure controls possible utilizing the gauge 10A, as fully disclosed in said Phillips and Zoludow patent, which may be referred to for a complete disclosure relative to the control circuiting involved.

DERIVATION OF EQUATION FOR CONTOUR OF ORIFICE OUTLET THROAT

Goal: To design an orifice outlet throat 307 that provides a linear relationship between the fluid volumetric flow rate (Q) through gauge 10, and the deflection X of target 86.

At equilibrium under the zero flow condition the drag force of the fluid upon the target 86 equals the opposing force of the cantilever spring mount on leaf spring 74.

Therefore:

$$\tfrac{1}{2} \tfrac{d}{g_c} A_T C_D V^2 = KX$$

where:
d = density of the flowing fluid,
$A_T$ = projected area of the target 86 in the direction
$C_D$ = the drag coefficient,
V = velocity of the flowing fluid,
K = the spring constant for the spring 74
X = the target and spring deflection, and
$g_c$ = dimensional correction factor.

By definition Q = VA, therefore V = Q/A, where:
Q = volumetric flow rate, and
A = the open area surrounding the target. By substitution:

$$\tfrac{1}{2} \tfrac{d}{g_c} A_T C_D \left(\tfrac{Q}{A}\right)^2 = KX, \text{ and, } \left(\tfrac{Q}{A}\right)^2 = \tfrac{2 g_c KX}{C_D d A_T}, \text{ and}$$

$$\tfrac{Q}{A} = \sqrt{\tfrac{2 g_c KX}{C_D d A_T}}, \text{ and, } Q = A \sqrt{\tfrac{2 g_c KX}{C_D d A_T}}.$$

If $$A = C \sqrt{X},$$

where C = a constant, then $Q = C_3 X$ where $C_3 =$ a constant, and,
$A = 3.14 R^2 - 3.14 r_o^2$
  $R_o =$ the radius of the target disc
  $R =$ the radius of the orifice adjacent to the target
With $3.14 R^2 - 3.14 R_{o2} = A$
Let $$A = c\sqrt{X},$$

then, $$3.14 R^2 - 3.14 r_o^2 = c\sqrt{X}$$

Let $R = f(X)$, then, $$\pi\{f(X)\}^2 - \pi r_o^2 = C\sqrt{X}, \{f(X)\}^2 - r_o^2 = \frac{C\sqrt{X}}{3.14},$$

$$\{f(X)\}^2 = \frac{C\sqrt{X}}{3.14} + r_o^2, f(X) = \left[\frac{C\sqrt{X}}{3.14} + r_o^2\right]^{\frac{1}{2}} = R$$

Therefore:

$$R_o = \left[\frac{C\sqrt{X_o}}{3.14} + r_o^2\right]^{\frac{1}{2}}, R_o^2 = \frac{C\sqrt{X_o}}{3.14} + r_o^2,$$

$$R_o^2 - r_o^2 = \frac{C\sqrt{X_o}}{\pi}, \frac{3.14(R_o^2 - r_o^2)}{\sqrt{X_o}} = C.$$

Substituting, $$R = \left[\frac{(R_o^2 - Y_o^2)}{\sqrt{X_o}}\sqrt{X} + r_o^2\right]^{\frac{1}{2}}$$

The desired outlet orifice throat contour is then:

$$R = \left[\frac{(R_o^2 - r_o^2)}{\sqrt{X_o}}\sqrt{X} + r_o^2\right]^{\frac{1}{2}}.$$

As a check we can write:

$$Q = \sqrt{\frac{2gc\, KX}{C_D\, d\, A_T}} \,(A),$$

$$A = 3.14 R^2 - 3.14 r_o^2 = 3.14\{R^2 - r_o^2\}$$

Substituting the derived equation for R:

$$Q =$$

$$\sqrt{\frac{2gc\, KX}{C_D\, d\, A_T}} \, 3.14\left\{\left(\left[\frac{(R_o^2 - r_o^2)}{\sqrt{X_o}}\sqrt{X} + r_o^2\right]^{\frac{1}{2}}\right)^2 - r_o^2\right\}$$

$$Q = \sqrt{\frac{2gc\, KX}{C_D\, d\, A_T}} \, 3.14\left\{\left[\frac{(R_o^2 - r_o^2)}{\sqrt{X_o}}\sqrt{X} + r_o^2\right] - r_o^2\right\}$$

-continued $$Q = \sqrt{\frac{2gc\, K}{C_D\, d\, A_T}} \, \sqrt{X} \, 3.14\left(\frac{(R_o^2 - r_o^2)}{\sqrt{X_o}}\right)\sqrt{X},$$

$$Q = 3.14\sqrt{\frac{2gc\, K}{C_D\, d\, A_T}} \left[\frac{(R_o^2 - r_o^2)}{\sqrt{X_o}}\right]X.$$

Since each symbol other than X is constant, a constant $C_o$ can be defined:

$$C_o = 3.14\sqrt{\frac{2gc\, K}{C_D\, d\, A_T}} \left[\frac{(R_o^2 - r_o^2)}{\sqrt{X_o}}\right]$$

Therefore:
$Q = C_o X$, a linear relationship

It will therefore be apparent that both the gauges 10 and 10A herein disclosed have a number of advantages.

For instance, both gauges can handle both liquids and gases, including air, at high temperatures/or pressures, that may be corrosive, since the fluid flow that is measured passes internally of the gauge and thus is fully sealed off from the gauge indicator pointer assembly. Both gauges can be mounted at any position of orientation relative to horizontal and vertical planes, such as in the horizontal position shown in FIG. 1 or in the upright positions shown in FIGS. 3 and 4, as well as upside down and backwards of these or any other positions of orientation, and provide the flow measurement benefits contemplated by the present invention, and without adverse effect.

Furthermore, the specific mounting arrangement of the drive and follower magnet assemblies 84 and 99, together with the relatively small size of the target 86, the small amount of deflection of the target, and the linearizing orifice throat 307 that is permitted by the disclosed instruments, as well as the freedom of the target from oscillation, insures a gauge linear read out, thereby permitting the use of a linear scale readout for the gauge.

Also, the basic instruments involved in utilizing the adjustable range spring device 72, permit any one instrument to be calibrated for different flow ranges. An associated advantage is that the gauges involved permit measurement of a wide variety of fluid flows with minimum part changeover or adjustment, which in connection with the disclosed gauges is concerned only with the size of the target, the adjustment of the range spring assembly 72, and the sizing of the orifice inlet 306 and throat 307.

It will also be appreciated that the general arrangement of the gauges herein disclosed permit utilization of the switching control features that are specifically disclosed in the Phillips and Zoludow U.S. Pat. No. 3,862,416. Where the gauge is arranged in this manner, it can be used to control flow rates in fluidic and pneumatic control systems, materials handling equipment, and as a flow alarm control, just to mention a few of the uses. Further, the control can be located remotely from the fluid flow that is being controlled, as from an instrument conveniently mounted on a control panel located at a centralized control facility of a commercial or industrial building.

With regard to the lever arm or leverage that the follower magnet 99 is to act through to pivot pointer 102 about axis, it has been found that a 0.100 inch radius lever arm will yield a 72 degree rotation response of pointer 102 to a 0.075 inch target deflection; a 0.150 inch radius lever arm will yield a 72 degree rotation response to of pointer 102 to a 0.105 inch target deflection.

If a 0.200 inch or greater radius arm is adapted, it has been found that the required target deflection would be so great (more than 0.140 inch) that overstress of the leaf spring is likely for most ranges. Leaf springs less than 0.018 inch thick are undesirable because pointer fluctuations caused by flow pulsations would be excessive. Small target deflections allow the use of thick springs (0.018 to 0.050 inches).

It has also been found that the leverage arrangement involved has a minimum torque requirement of 2.534 ($10^{-4}$) in-lb.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A target fluid flow indicator gauge comprising:
    a housing formed from a non-magnetic material and defining an internal chamber having an orifice having a throat and fluid inflow and outflow ports disposed on opposite sides of said chamber and axially aligned to direct fluid flow into and out of said chamber and through said orifice throat in a predetermined fluid flow direction through said housing,
    said throat being curvilinear about a central axis that is substantially coaxial with said ports, and defining an inlet and an outlet that are coaxial with said axis,
    a leaf spring cantilever mounted in said housing adjacent one end of said leaf spring for disposing said leaf spring to extend substantially crosswise of said fluid flow direction,
    said leaf spring being exposed to said chamber,
    a target centered in said direction of fluid flow and disposed in centered relation within said orifice throat and fixed to the other end of said leaf spring for limited movement thereof in said direction of fluid flow when fluid flow through the housing impinges against said target,
    said target comprising a round disc member,
    said orifice throat including means for effecting a linear deflection of said target in response to said fluid flow,
    said throat means comprising said throat having a margining wall shaped according to the equation $$R = \left( \frac{(R_o^2 - r_o^2)}{\sqrt{X_o}} \sqrt{X} + r_o^2 \right)^{\frac{1}{2}}.$$

wherein $R_o$ is the radius of said throat at said throat outlet of same, $r_o$ is the radius of said throat at said throat inlet and is the maximum radius of said disc member, $X_o$ is the linear distance between said throat outlet and said throat inlet along said central axis, X is the selected distance measured from said throat inlet in the direction of said throat outlet along said central axis, and R is the radius of said throat for selected values of X, whereby said target has a deflection response that is linear relative to increasing fluid flow rates,
    a driving magnet assembly movable with said target within said housing,
    an indicator pointer disposed externally of said chamber and journaled to pivot about an axis extending crosswise of said fluid flow direction,
    a scale located externally of said housing adjacent said pointer that is calibrated for linear readout, using said pointer, on deflection of said target by the fluid in said fluid flow direction,
    and a follower magnet assembly disposed externally of said chamber and being magnetically coupled to said driving magnet assembly and being fixed with respect to said indicator pointer to pivot said pointer about said axis,
    said housing including an imperforate wall structure of film thickness proportions separating said magnet assemblies, and the magnetic coupling of said magnet assemblies being through said wall structure.

2. The target fluid flow indicator gauge set forth in claim 1 wherein:
    said follower magnet assembly acts, in following the movement of said driving magnet assembly, through a lever arm, which movement lies in the range of from about 0.100 inch to about 1.175 inch.

3. The target fluid flow indicator gauge set forth in claim 1 wherein:
    said driving magnet assembly comprises a permanent magnet means oriented to present side-by-side located pole faces, consecutively of said driving magnet assembly, of alternate polarity to said wall structure,
    said follower magnet assembly comprising a permanent magnet oriented to present to said wall structure a pole face of one of said polarities of said driving magnet assembly.

4. The target fluid flow indicator gauge set forth in claim 3 wherein:
    said permanent magnet means pole faces of said driving magnet assembly are three in number in row form,
    with the pole face of said follower magnet assembly having a polarity that is the same as the polarity of the driving magnet assembly pole faces at the ends of said driving magnet assembly row.

5. The target fluid flow indicator gauge set forth in claim 3 wherein:
    said pole faces are planar in configuration and are disposed in coplanar relation and in closely spaced relation to said wall structure.

6. The target fluid flow indicator gauge set forth in claim 5 wherein:
    said housing includes an imperforate wall structure of film thickness proportions separating said magnet assemblies, and the magnetic coupling of said magnet assemblies being through said wall structure, with the thickness of said wall structure lying in the range of from about 0.050 inch to about 0.070 inch.

7. The target fluid flow indicator gauge set forth in claim 1 wherein:
    said target has a readout deflection that yields a response of said pointer of approximately 2 degrees.

8. The target fluid flow indicator gauge set forth in claim 1 including:
    a scale located externally of said housing adjacent said pointer that is calibrated for linear readout, using said pointer, on deflection of said target, in said fluid flow direction.

9. The target fluid flow indicator gauge set forth in claim 1 wherein:
said leaf spring has a live length that includes said other end of said leaf spring,
with said live length of said leaf spring being adjustable to accommodate variant ranges of fluid flow rates.

10. The target fluid flow indicator gauge set forth in claim 1 wherein:
said wall structure acts as magnetic flux passing window whereby the flux of the follower magnet assembly is coupled to the flux of the driving magnet assembly to form a magnetically coupled motion transmitting arrangement.

11. A target fluid flow indicator gauge comprising:
a non-magnetic housing comprising a housing member, back plate therefore, and a tubular member insert defining an orifice having a throat, and, as assembled, defining a fluid flow way through said housing that includes said tubular member,
said throat being curvilinear about a central axis that is substantially coaxial thereof and defining an outlet therefrom and an inlet thereto that are coaxial with said axis,
a leaf spring cantilever mounted in said housing member and adjacent one end of said leaf spring for disposing said leaf spring to be exposed to and extend toward said flow way adjacent said outlet of said throat,
a target centered in said throat and comprising a round disc member,
a lever member fixed to the other end of said leaf spring and extending diametrically across said flow way,
said target being anchored to said lever member and disposed to be positioned coaxially of said throat and in close fitting relation therein,
said housing member and back plate as assembled further defining fluid inflow and outflow ports adjacent opposite ends of said tubular member,
said inflow and outflow ports being substantially centered on said tubular member and being aligned to direct fluid flow against and about said target and out of said throat in a predetermined fluid flow direction through said housing,
said orifice throat including means for effecting a linear deflection of said target in response to said fluid flow,
said throat means comprising said throat having a margining wall shaped according to the equation $$R = \left( \frac{(R_o^2 - r_o^2)}{\sqrt{X_o}} \sqrt{X} + r_o^2 \right)^{\frac{1}{2}},$$

wherein $R_o$ is the radius of said throat at said throat outlet of same, $r_o$ is the radius of said throat at said throat inlet and is the maximum radius of said disc member, $X_o$ is the linear distance between said throat outlet and said throat inlet along said central axis, X is the selected distance measured from said throat inlet in the direction of said throat outlet along said central axis, and R is the radius of said throat for selected values of X,
said lever member having fixed to same a driving magnet assembly,
an indicator pointer disposed to one side of said housing member and externally thereof, and being journaled to pivot about an axis that extends crosswise of said fluid flow direction,
a follower magnet assembly disposed externally of said housing member on said one side thereof,
said follower magnet assembly being fixed to said indicator pointer to pivot said pointer about said pivot axis through a lever arm that lies in the range of from about 0.100 inch to about 0.200 inch,
said magnet assemblies being in confronting relation and being separated by an imperforate wall structure of said housing member, through which wall structure said magnet assemblies are magnetically coupled,
said target having a sufficiently short readout deflection that said lever arm said follower magnet assembly acts through lies in said range,
whereby said pointer movement under the movement induced in said follower magnet assembly by said drive magnet assembly is linear,
whereby said pointer may have a scale readout that is linear relative to fluid flow rate through said housing.

12. The target fluid flow indicator gauge set forth in claim 11 wherein:
said driving magnet assembly comprises a permanent magnet means oriented to present side-by-side pole faces, consecutively of said driving magnet assembly, of alternate polarity to said wall structure,
said follower magnet assembly comprising a permanent magnet oriented to present to said wall structure a pole face of one of said polarities of said driving magnet assembly.

13. The target fluid flow indicator gauge set forth in claim 12 wherein:
said permanent magnet means pole faces of said driving magnet assembly are three in number in row form,
with the pole face of said follower magnet assembly having a polarity that is the same as the polarity of the driving magnet assembly pole faces at the ends of said driving magnet assembly row.

14. The target fluid flow indicator gauge set forth in claim 12 wherein:
said pole faces are planar in configuration and are disposed in coplanar relation and in closely spaced relation to said wall structure.

15. The target fluid flow indicator gauge set forth in claim 14 wherein:
the thickness of said wall structure lies in the range of from about 0.050 inch to about 0.070 inch.

16. The target fluid flow indicator gauge set forth in claim 11 including:
a scale located externally of said housing member side adjacent and under said pointer that is calibrated for linear readout, using said pointer, on deflection of said target, in said fluid flow direction.

17. The target-fluid flow indicator gauge set forth in claim 11 wherein:
said leaf spring has a live length that includes said other end of said leaf spring,
with said live length of said leaf spring being adjustable to accommodate variant ranges of fluid flow rates.

18. The target fluid flow indicator gauge set forth in claim 11 wherein:
said wall structure acts as magnetic flux passing window whereby the flux of the follower magnet assembly is coupled to the flux of the driving magnet assembly.

* * * * *